United States Patent
Liu et al.

(10) Patent No.: US 11,373,055 B2
(45) Date of Patent: Jun. 28, 2022

(54) BIDIRECTIONAL ATTENTION-BASED IMAGE-TEXT CROSS-MODAL RETRIEVAL METHOD

(71) Applicant: XIDIAN UNIVERSITY, Shaanxi (CN)

(72) Inventors: Jing Liu, Shaanxi (CN); Yujia Shi, Shaanxi (CN)

(73) Assignee: XIDIAN UNIVERSITY, Xi'an (CN)

(*) Notice: Subject to any disclaimer, the term of this patent is extended or adjusted under 35 U.S.C. 154(b) by 14 days.

(21) Appl. No.: 16/946,441

(22) Filed: Jun. 22, 2020

(65) Prior Publication Data
US 2021/0012150 A1    Jan. 14, 2021

(30) Foreign Application Priority Data
Jul. 11, 2019 (CN) .......................... 201910626468.4

(51) Int. Cl.
*G06K 9/62* (2022.01)
*G06N 3/08* (2006.01)
(Continued)

(52) U.S. Cl.
CPC ........... *G06K 9/6215* (2013.01); *G06F 16/44* (2019.01); *G06K 9/6256* (2013.01); *G06N 3/08* (2013.01); *G06V 10/40* (2022.01); *G06V 30/10* (2022.01)

(58) Field of Classification Search
CPC ...... G06K 9/6215; G06K 9/6212; G06K 9/62; G06K 9/6256; G06K 9/6257; G06K 9/6259; G06K 9/624; G06K 9/46; G06K 9/4604; G06K 9/4671; G06K 9/4676; G06K 2209/01; G06F 16/48; G06N 3/08; G06N 3/084; G06N 3/088; G06V 10/40;
(Continued)

(56) References Cited

U.S. PATENT DOCUMENTS

2019/0138613 A1* 5/2019 Adada ................... G06N 20/00
2020/0320429 A1* 10/2020 Jha ......................... G06N 20/00
2021/0264208 A1* 8/2021 Damodaran ....... G06K 9/00469

FOREIGN PATENT DOCUMENTS

CN        108288067 A        7/2018

OTHER PUBLICATIONS

F. Huang, X. Zhang, Z. Zhao and Z. Li, "Bi-Directional Spatial-Semantic Attention Networks for Image-Text Matching," in IEEE Transactions on Image Processing, vol. 28, No. 4, pp. 2008-2020, Apr. 2019, doi: 10.1109/TIP.2018.2882225. (Year: 2019).*
(Continued)

*Primary Examiner* — Claire X Wang
*Assistant Examiner* — Stephen M Brinich

(57) ABSTRACT

The present disclosure provides a bidirectional attention-based image-text cross-modal retrieval method, applicable for cross-modal retrieval between natural image and electronic text. The present disclosure extracts initial image and text features by using a neural network, and builds a bidirectional attention module to reconstruct the initial image and text features extracted by the neural network, the reconstructed features containing richer semantic information. By using the bidirectional attention module, the present disclosure improves the conventional feature extraction process, obtaining higher-order features with richer image and text semantics, thereby realizing image-text cross-modal retrieval.

7 Claims, 1 Drawing Sheet

(51) Int. Cl.
  *G06V 10/40* (2022.01)
  *G06F 16/44* (2019.01)
  *G06V 30/10* (2022.01)

(58) Field of Classification Search
  CPC .... G06V 10/42; G06V 10/454; G06V 10/451; G06V 10/82; G06V 30/10; G06V 30/14
  USPC .............. 382/155–160, 100, 229, 290, 292
  See application file for complete search history.

(56) References Cited

OTHER PUBLICATIONS

Shuang Li, et al. Person Search With Natural Language Description. Mar. 30, 2017. 10 pages. http://openaccess.thecvf.com/content_cvpr_2017/papers/Li_Person_Search_With_CVPR_2017_paper.pdf.

* cited by examiner

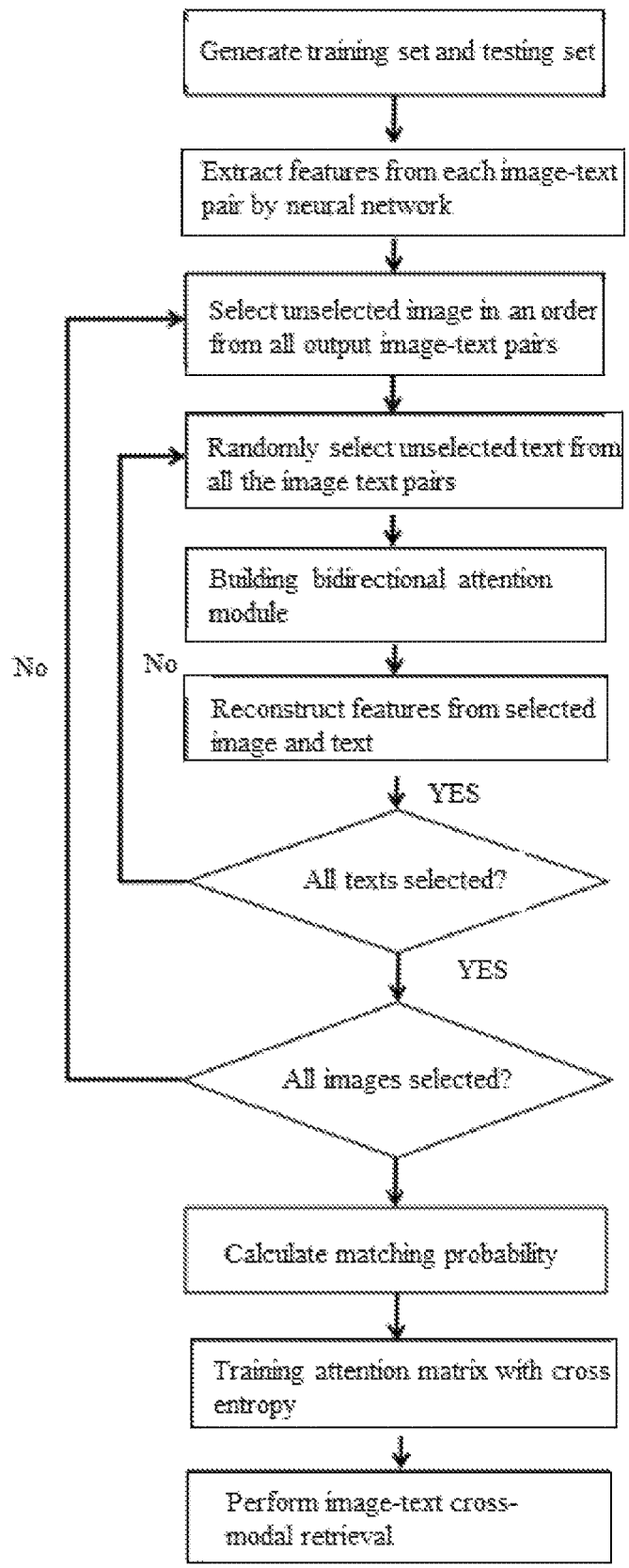

BIDIRECTIONAL ATTENTION-BASED IMAGE-TEXT CROSS-MODAL RETRIEVAL METHOD

CROSS-REFERENCE TO RELATED APPLICATIONS

This application claims priority to Chinese patent application number 201910626468.4, filed Jul. 11, 2019, the disclosure of which is incorporated by reference.

TECHNICAL FIELD

The present disclosure relates to the technical field of image processing, and in particular to a bidirectional attention-based image-text cross-modal retrieval method in the interdisciplinary of natural language processing and computer vision. The present disclosure can explore a deeper relation between the two different modalities, natural image and electronic text, extract natural image features and electronic text features and calculate a matching probability between natural image and electronic text by using the extracted features, to realize a natural image-electronic text cross-modal retrieval.

BACKGROUND

Two approaches are present in image-text cross-modal retrieval: one builds a similarity learning network, the other builds a feature extraction network. The similarity learning network is used to learn a similarity between data from two modalities and generate a score; an image-text set with the highest score will be selected, completing the cross-modal retrieval. The feature extraction network is used to extract respective higher-order features from image and text and calculate a similarity between the features by a simple similarity calculation formula; an image-text pair with the highest similarity will be selected, completing the cross-modal retrieval. Neural networks have a multi-layer structure, can extract high-order features from data, and are commonly used for text and image processing. Attention mechanism can capture joint features from the interplay between different modalities and weight and reconstruct other features by using the joint features, thereby fully exploring interplay information. A main idea of the bidirectional attention-based image-text cross-modal retrieval method is to extract initial features from image and text by using a neural network, build a bidirectional attention module to reconstruct image and text features and calculate a matching probability between image and text by using the reconstructed features, thereby realizing cross-modal retrieval.

Tencent Technology (Shenzhen) Co., Ltd. in its patent application "Image-text Matching Model Training Method, Bidirectional Search Method and Relevant Apparatus" (Appl. No.: 201710817344.5, Pub. No.: CN108288067A) proposes a deep neural network-based image-text bi-directional search method. This method uses a convolutional neural network model to extract image features and text features, and builds a similarity measure network to calculate a feature similarity. The method can extract higher-order features from images and texts by using the multi-layer network, but has a drawback that, image and text are of different modalities and the heterogeneity of data prevents accurate capture of the semantics in image and text by a simple deep neural network-based feature extraction, as a result, measuring the similarity between higher-order features of the image and text is little-to-not feasible, thereby affecting retrieval precision.

S Li, T Xiao, H Li, B Zhou, et al. in their article "Person Search with Natural Language Description" (International Conference on Computer Vision and Pattern Recognition, 2017:1970-1979) proposes a unidirectional attention-based image-text search method. This method uses an attention to weight text features with extracted image features and reconstruct the text features, to increase the similarity between image and text. The method uses an attention to reconstruct text features but has a drawback that, only text features are reconstructed, by an attention in image-to-text direction. Because image and text correspond and their corresponding higher-order features interact, reconstructing text features without image features cannot provide accurate correspondence between image and text and thereby affects the performance of image-text cross-modal retrieval.

SUMMARY OF INVENTION

An object of the present disclosure is to overcome the drawbacks in the prior art and provide a bidirectional attention-based image-text cross-modal retrieval method, to solve the problem of image-text cross-modal retrieval with shared semantics in image and text.

An idea to achieve the object of the present disclosure is to use an attention to capture joint features from the interplay between different modalities, and use the joint features to weight and reconstruct other features, thereby fully exploring interplay information. By building a bidirectional attention module, initial image and text features extracted by a deep neural network can be reconstructed and these reconstructed features contain richer semantic information.

According to the present disclosure, the method may include the following steps:

(1) generating a training set and a testing set:
randomly selecting 25000 image-text pairs from the Flickr30k dataset, of which 15000 image-text pairs form the training set and 10000 image-text pairs form the testing set;

(2) extracting features from each image-text pair by using a neural network:

(2a) building a 14-layer neural network, and setting and training parameters for each layer;

(2b) inputting the training set to the trained convolutional neural network, and acquiring output 15000 image-text pairs, each of the image-text pairs comprising an image with 100 image features and a text with 100 text features;

(3) selecting an unselected image according to an order from all the output image-text pairs;

(4) randomly selecting an unselected text from all the image text pairs;

(5) building a bidirectional attention module:

(5a) calculating a similarity between every image feature of the selected image and every text feature of the selected text according to the equation below:

$$R_{i,k} = \tanh(y_i^T A x_k),$$

where $R_{i,k}$ denotes the similarity between a kth image feature of the selected image and an ith text feature of the selected text; tanh denotes a hyperbolic tangent function; $y_i$ denotes the ith text feature of the selected text; T denotes a transpose operation; A denotes a randomly generated 15000×15000 dimensional attention matrix; $x_k$ denotes the kth image feature of the selected image;

(5b) for each image feature, building an image feature similarity vector from the similarities between the image feature and all text features of the selected text, and average-pooling each image feature similarity vector; for each text feature, building a text feature similarity vector from the similarities between the text feature and all image features of the selected image, and average-pooling each text feature similarity vector;

(5c) for each image feature of the selected image, calculating an importance of the image feature in all image features of the selected image according to the soft attention formula below:

$$a_k = \frac{\exp(u_k)}{\sum_{d=1}^{n} \exp(u_d)},$$

where $a_k$ denotes the importance of a kth image feature in all image features of the selected image; exp denotes the natural exponential function; $u_k$ denotes the average-pooled kth image feature similarity; Σ denotes a summation function; n denotes the total number of image feature similarities of the selected image; $u_d$ denotes the average-pooled dth image feature similarity with d ranging from 1 to n;

(5d) for each text feature of the selected text, calculating an importance of the text feature in all text features of the selected text according to the soft attention formula below:

$$b_i = \frac{\exp(t_i)}{\sum_{m=1}^{l} \exp(t_m)},$$

where $b_i$ denotes the importance of an ith text feature in all text features of the selected text; $t_i$ denotes the average-pooled ith text feature similarity; l denotes the total number of text feature similarities of the selected text; $t_m$ denotes the average-pooled mth text feature similarity with m ranging from 1 to l;

(6) reconstruct image features of the selected image and text features of the selected text:

(6a) acquiring reconstructed image features by multiplying the image features by their corresponding importances;

(6b) acquiring reconstructed text features by multiplying the text features by their corresponding importances;

(7) determining whether all texts of all the image-text pairs have been selected, if so, proceeding to step (8); otherwise, proceeding to step (4);

(8) determining whether all images of all the image-text pairs have been selected, if so, proceeding to step (9); otherwise, proceeding to step (3);

(9) calculating a matching probability:

(9a) for each image, calculating a matching probability of the image to every text in the image-text pairs according to a softmax function;

(9b) for each text, calculating a matching probability of the text to every image in the image-text pairs according to a softmax function;

(10) training the attention matrix with a cross entropy:

(10a) for each image, calculating a cross entropy of the matching probability of the image to every text relative to a true matching probability of the image to the text according to a cross entropy formula;

(10b) updating the elements of the attention matrix according to a gradient descent formula with an iteratively changed cross entropy, until the cross entropy is less than 0.000001, at which time the attention matrix is deemed trained;

(11) performing image-text cross-modal retrieval:

(11a) inputting all the image-text pairs in the testing set to the neural network trained in step (2), and acquiring features of all the image-text pairs in the testing set;

(11b) multiplying every image feature and text feature of the image-text pairs as in step (5a) by the trained attention matrix, and acquiring a matching probability between every image and text upon reconstruction;

(11c) selecting the highest matching probability from the matching probabilities upon reconstruction, and taking the corresponding image-text pair as the retrieval result.

As compared with the prior art, the present disclosure has the following advantages:

First, the present discourse cross-processes features of different modalities by using a bidirectional attention, and calculates the importance of each image feature in all image features and the importance of each text feature in all text features, thereby overcoming the drawback in the prior art with simply using an attention in image-to-text direction that, image and text correspond and their corresponding higher-order features interact, thus text affects image too. The present disclosure explores the interplay information from the interplay between image and text, and can more accurately capture the semantics in image and text.

Second, the present discourse reconstructs image features and text features according to the importance of each image feature and the importance of each text feature that are acquired by using the bidirectional attention, thereby overcoming the drawback in the prior art that, image and text are of different modalities and the heterogeneity of data prevents accurate capture of the semantics in image and text by a simple deep neural network-based feature extraction, thus measuring the similarity between higher-order features of the image and text is little-to-not feasible. The method according to the present discourse can more accurately construct image and text features.

BRIEF DESCRIPTION OF THE DRAWINGS

FIG. 1 is a flow chart illustrating an embodiment of the present disclosure.

DETAILED DESCRIPTION OF PARTICULAR EMBODIMENTS

Embodiments of the present disclosure are described herein in detail below in conjunction with the accompanying drawing.

Specific steps of a method according to an embodiment of the present disclosure will be described below with reference to FIG. 1.

Step 1, generating a training set and a testing set:

randomly selecting 25000 image-text pairs from the Flickr30k dataset, of which 15000 image-text pairs form the training set and 10000 image-text pairs form the testing set;

Step 2, extracting features from each image-text pair by using a neural network:

building the layer neural network with 27 layers, and setting and training parameters for each layer to form a trained neural network;

The neural network with 27 layers may be built as follows: first convolutional layer→first pooling layer→second convolutional layer→second pooling layer→third convolutional layer→third pooling layer→fourth convolutional layer→fourth pooling layer→fifth convolutional layer→fifth pooling layer→sixth convolutional layer→sixth pooling layer→seventh convolutional layer→seventh pooling layer→eighth convolutional layer→eighth pooling layer→ninth convolutional layer→ninth pooling layer→tenth convolutional layer→tenth pooling layer→eleventh convolutional layer→eleventh pooling layer→twelfth convolutional layer→twelfth pooling layer→thirteenth convolutional layer→thirteenth pooling layer→fully-connected layer.

The parameters of each layer may be set as follows: each of the first convolutional layer and the second convolutional layer has 64 3×3 convolution kernels; each of the third convolutional layer and the fourth convolutional layer has 128 3×3 convolution kernels; each of the fifth convolutional layer, the sixth convolutional layer, and the seventh convolutional layer has 256 3×3 convolution kernels; each of the eighth convolutional layer, the ninth convolutional layer, the tenth convolutional layer, the eleventh convolutional layer, the twelfth convolutional layer, and the thirteenth convolutional layer has 512 3×3 convolution kernels; all pooling layers are max-pooling, and each of the pooling layers has 2×2 pooling kernels with a stride of 2; the fully-connected layer has 4086 inputs and 100 outputs.

inputting the training set to the trained neural network, and acquiring output 15000 image-text pairs, each of the image-text pairs comprising an image with 100 image features and a text with 100 text features;

Step 3, selecting an unselected image according to an order from all the output image-text pairs;

Step 4, randomly selecting an unselected text from all the image text pairs;

Step 5, building a bidirectional attention module:

calculating a similarity between every image feature of the selected image and every text feature of the selected text according to the equation below:

$$R_{i,k} = \tanh(y_i^T A x_k),$$

where $R_{i,k}$ denotes the similarity between a kth image feature of the selected image and an ith text feature of the selected text; tanh denotes a hyperbolic tangent function; $y_i$ denotes the ith text feature of the selected text; T denotes a transpose operation; A denotes a randomly generated 15000×15000 dimensional attention matrix; $x_k$ denotes the kth image feature of the selected image;

For each image feature, building an image feature similarity vector from the similarities between the image feature and all text features of the selected text, and average-pooling each image feature similarity vector; for each text feature, building a text feature similarity vector from the similarities between the text feature and all image features of the selected image, and average-pooling each text feature similarity vector;

For each image feature of the selected image, calculating an importance of the image feature in all image features of the selected image according to the soft attention formula below:

$$a_k = \frac{\exp(u_k)}{\sum_{d=1}^{n} \exp(u_d)},$$

where $a_k$ denotes the importance of a kth image feature in all image features of the selected image; exp denotes the natural exponential function; $u_k$ denotes the average-pooled kth image feature similarity; Σ denotes a summation function; n denotes the total number of image feature similarities of the selected image; $u_d$ denotes the average-pooled dth image feature similarity with d ranging from 1 to n;

for each text feature of the selected text, calculating an importance of the text feature in all text features of the selected text according to the soft attention formula below:

$$b_i = \frac{\exp(t_i)}{\sum_{m=1}^{l} \exp(t_m)},$$

where $b_i$ denotes the importance of an ith text feature in all text features of the selected text; $t_i$ denotes the average-pooled ith text feature similarity; l denotes the total number of text feature similarities of the selected text; $t_m$ denotes the average-pooled mth text feature similarity with m ranging from 1 to l;

Step 6, reconstruct image features of the selected image and text features of the selected text:

acquiring reconstructed image features $[X_1, \ldots, X_k, \ldots, X_n]$ by multiplying the image features by their corresponding importances, according to the equation below:

$$[X_1, \ldots, X_k, \ldots, X_n] = [a_1 x_1, \ldots, a_k x_k, \ldots, a_n x_n]$$

where $X_k = a_k x_k$, $X_k$ denotes the reconstructed kth image feature of the selected image with k ranging from 1 to n;

acquiring reconstructed text features $[Y_1, \ldots, Y_i, \ldots, Y_l]$ by multiplying the text features by their corresponding importances, according to the equation below:

$$[Y_1, \ldots, Y_i, \ldots, Y_l] = [b_1 y_1, \ldots, b_i y_i, \ldots, b_l y_l]$$

where $Y_i = b_i y_i$, $Y_i$ denotes the reconstructed ith text feature of the selected text with i ranging from 1 to l;

Step 7, determining whether all texts of all the image-text pairs have been selected, if so, proceeding to step 8; otherwise, proceeding to step 4;

Step 8, determining whether all images of all the image-text pairs have been selected, if so, proceeding to step 9; otherwise, proceeding to step 3;

Step 9, calculating a matching probability:

For each image, calculating a matching probability of the image to every text in the image-text pairs according to a softmax function below:

$$p_{q,j} = \frac{\exp(V_q^T T_j)}{\sum \exp(V_q^T T_r)},$$

where $p_{q,j}$ denotes the matching probability of a qth image to a jth text in the image-text pairs; exp denotes the natural exponential function; $V_q$ denotes a qth image feature in the image-text pairs; T denotes a transpose operation; $T_j$ denotes a jth text feature in the image-text pairs; Σ denotes a summation function; $T_r$ denotes a rth text feature in the image-text pairs with r ranging from 1 to 15000;

For each text, calculating a matching probability of the text to every image in the image-text pairs according to a softmax function below:

$$p_{j,q} = \frac{\exp(T_j^T V_q)}{\sum \exp(T_j^T V_s)},$$

where $p_{j,q}$ denotes the matching probability of a jth text to a qth image in the image-text pairs; exp denotes the natural exponential function; $T_j$ denotes a jth text feature in the image-text pairs; T denotes a transpose operation; $V_q$ denotes a qth image feature in the image-text pairs; $\Sigma$ denotes a summation function; $V_s$ denotes an sth image feature in the image-text pairs with s ranging from 1 to 15000;

Step 10, training the attention matrix with a cross entropy:

For each image, calculating a cross entropy of the matching probability of the image to every text relative to a true matching probability of the image to the text according to a cross entropy formula, the cross entropy formula being:

$$L_{j,q} = y_{j,q} \ln p_{j,q},$$

where $L_{j,q}$ denotes the cross entropy of the matching probability of a jth text to a qth image relative to a true matching probability of the jth text to the qth image; $y_{j,q}$ denotes the true matching probability of the jth text to the qth image; ln denotes the natural logarithm; $p_{q,j}$ denotes the matching probability of the qth image to the jth text;

updating the elements of the attention matrix according to a gradient descent formula with an iteratively changed cross entropy, until the cross entropy is less than 0.000001, at which time the attention matrix is deemed trained, the gradient descent formula being:

$$A_{j,q}^{(s+1)} = A_{j,q}^{(s)} - \eta \times \frac{\partial L_{j,q}}{\partial A_{j,q}^{(s)}} \times A_{j,q}^{(s)},$$

where $A_{j,q}^{(s+1)}$ denotes an element of the attention matrix at jth row and qth column after (s+1)th iteration; $A_{j,q}^{(s)}$ denotes an element of the attention matrix at jth row and qth column after sth iteration; $\eta$ denotes a learning rate of 0.001;

$\frac{\partial}{\partial}$ denotes partial derivative; $L_{j,q}$ denotes the cross entropy of the matching probability of a jth text to a qth image relative to a true matching probability of the jth text to the qth image;

Step 11, performing image-text cross-modal retrieval:

inputting all the image-text pairs in the testing set to the trained neural network in step 2, and acquiring features of all the image-text pairs in the testing set;

multiplying every image feature and text feature of the image-text pairs as in Step 5 by the trained attention matrix to acquire the importance of every image feature and text feature in all image features and text features, reconstructing all image features and text features according to the importance, and calculating a matching probability between every reconstructed image and text;

selecting the highest matching probability from the matching probabilities upon reconstruction, and taking the corresponding image-text pair as the retrieval result.

Performance of the embodiment of the present disclosure is illustrated below through a simulation.

1. Simulation Conditions:

Hardware platform of the simulation: Nvidia Geforce GTX 1080 GPU.

Software platform of the simulation: Windows System 10 and TensorFlow 1.9. 0.

2. Simulation Content and Simulation Results:

In this simulation, the Flickr30k dataset released by Yahoo is used in the generating of a training set and a testing set. This dataset contains 31783 image-text pairs. In this simulation, 25000 image-text pairs are randomly selected from the 31783 image-text pairs of the Flickr30k dataset, of which 15000 image-text pairs are used as training data, and 10000 image-text pairs are used testing data.

In this simulation, the embodiment of the present disclosure and three existing methods, Multimodal convolutional neural network (m-CNN), Depth structure-preserving embeddings (DSPE) and Recurrent residual fusion network (RRF-Net), are used to retrieve a corresponding text for each image and a corresponding image for each text from the 10000 image-text pairs in the testing set.

Specifically, the Existing Methods are:

Multimodal convolutional neural network refers to the method proposed in "Multimodal convolutional neural networks for matching image and sentence, In: Proceedings of the IEEE International Conference on Computer Vision, pp. 2623-2631, 2015" by L Ma et al., in short: m-CNN.

Depth structure-preserving embeddings refers to the method proposed "Learning deep structure-preserving image-text embeddings, In: Proceedings of the IEEE Conference on Computer Vision and Pattern Recognition, pp. 5005-5013, 2016" by L Wang et al, in short: DSPE.

Recurrent residual fusion network refers to the method proposed in "Learning a recurrent residual fusion network for multimodal matching, In: Proceedings of the IEEE International Conference on Computer Vision, pp. 4107-4116, 2017' by Y Liu et al., in short: RRF-NET.

To evaluate the results from the simulation according to the present disclosure, a criterion Recall@1 is used, in which the matching probabilities between image and text are sorted in a descending order, the one with the highest matching probability being the retrieval result, and the proportion of correct retrieval results to all testing data is recorded, as shown in Table 1 below.

TABLE 1

Recall of the present disclosure in comparison with existing methods

| Method | Image-to-Text Retrieval Recall@ 1 | Text-to-Image Retrieval Recall@ 1 |
| --- | --- | --- |
| m-CNN | 64.1% | 56.3% |
| DSPE | 68.9% | 60.1% |
| RRF-Net | 77.4% | 68.3% |
| Bidirectional attention-based image-text cross-modal retrieval | 79.2% | 68.8% |

Table 1 illustrates the results based on the criterion Recall@1, the respective proportions of correct retrieval results to all testing data, from Multimodal convolutional neural network (m-CNN), Depth structure-preserving embeddings (DSPE), Recurrent residual fusion network (RRF-Net) and the embodiment of the present disclosure.

As can be seen from Table 1, according to the embodiment of the present disclosure, image-to-text retrieval has a correct retrieval result to all testing data ratio of 79.2%, text-to-image retrieval has a correct retrieval result to all testing data ratio of 68.8%, each time higher than the three existing methods. This shows that the method of the present disclosure can realize a more accurate image-text cross-modal retrieval, and the bidirectional attention module can extract more accurate features when constructing image and text features.

The invention claimed is:

1. A bidirectional attention-based image-text cross-modal retrieval method, characterized in that the method cross-processes features of different modalities by using a bidirectional attention, and reconstructs text and image features by using a joint feature from the cross processing, the method comprising:
   (1) generating a training set and a testing set:
   randomly selecting 25000 image-text pairs from a dataset, 15000 image-text pairs of the 25000 image-text pairs form the training set and 10000 image-text pairs of the 25000 image-text pairs form the testing set;
   (2) extracting features from each image-text pair by using a neural network:
   (2a) building the neural network with 27 layers, and setting and training parameters for each layer to form a trained neural network;
   (2b) inputting the training set to trained neural network, and acquiring output the 15000 image-text pairs, each of the image-text pairs comprising an image with 100 image features and a text with 100 text features;
   (3) selecting an unselected image according to an order from all the output image-text pairs;
   (4) randomly selecting an unselected text from all the image text pairs;
   (5) building a bidirectional attention module:
   (5a) calculating a similarity between every image feature of the selected image and every text feature of the selected text according to the equation below:

$$R_{i,k} = \tanh(y_i^T A x_k)$$

where $R_{i,k}$ denotes the similarity between a kth image feature of the selected image and an ith text feature of the selected text; tanh denotes a hyperbolic tangent function; $y_i$ denotes the ith text feature of the selected text; T denotes a transpose operation; A denotes a randomly generated 15000×15000 dimensional attention matrix; $x_k$ denotes the kth image feature of the selected image;
   (5b) for each image feature, building an image feature similarity vector from the similarities between the image feature and all text features of the selected text, and average-pooling each image feature similarity vector; for each text feature, building a text feature similarity vector from the similarities between the text feature and all image features of the selected image, and average-pooling each text feature similarity vector;
   (5c) for each image feature of the selected image, calculating an importance of the image feature in all image features of the selected image according to the soft attention formula below:

$$a_k = \frac{\exp(u_k)}{\sum_{d=1}^{n} \exp(u_d)},$$

where $a_k$ denotes the importance of a kth image feature in all image features of the selected image; exp denotes the natural exponential function; $u_k$ denotes the average-pooled kth image feature similarity; Σ denotes a summation function; n denotes the total number of image feature similarities of the selected image; $u_d$ denotes the average-pooled dth image feature similarity with d having a range [1, n];
   (5d) for each text feature of the selected text, calculating an importance of the text feature in all text features of the selected text according to the soft attention formula below:

$$b_i = \frac{\exp(t_i)}{\sum_{m=1}^{l} \exp(t_m)},$$

where $b_i$ denotes the importance of an ith text feature in all text features of the selected text; $t_i$ denotes the average-pooled ith text feature similarity; l denotes the total number of text feature similarities of the selected text; $t_m$ denotes the average-pooled mth text feature similarity with m having a range [1, l];
   (6) reconstruct image features of the selected image and text features of the selected text:
   (6a) acquiring reconstructed image features by multiplying the image features by their corresponding importances;
   (6b) acquiring reconstructed text features by multiplying the text features by their corresponding importances;
   (7) determining whether all texts of all the image-text pairs have been selected, if so, proceeding to step (8); otherwise, proceeding to step (4);
   (8) determining whether all images of all the image-text pairs have been selected, if so, proceeding to step (9); otherwise, proceeding to step (3);
   (9) calculating a matching probability:
   (9a) for each image, calculating a matching probability of the image to every text in the image-text pairs according to a softmax function;
   (9b) for each text, calculating a matching probability of the text to every image in the image-text pairs according to a softmax function;
   (10) training the attention matrix with a cross entropy:
   (10a) for each image, calculating a cross entropy of the matching probability of the image to every text relative to a true matching probability of the image to the text according to a cross entropy formula;
   (10b) updating the elements of the attention matrix according to a gradient descent formula with an iteratively changed cross entropy, until the cross entropy is less than 0.000001, at which time the attention matrix is deemed trained;
   (11) performing image-text cross-modal retrieval:
   (11a) inputting all the image-text pairs in the testing set to the trained neural network in step (2), and acquiring features of all the image-text pairs in the testing set;
   (11b) multiplying every image feature and text feature of the image-text pairs as in step (5a) by the trained attention matrix to acquire the importance of every image feature and text feature in all image features and text features, reconstructing all image features and text features according to the importance, and calculating a matching probability between every reconstructed image and text;

(11c) selecting the highest matching probability from the matching probabilities upon reconstruction, and taking the corresponding image-text pair as the retrieval result.

2. The bidirectional attention-based image-text cross-modal retrieval method according to claim 1, wherein in step (2a) the neural network is built as follows: first convolutional layer→first pooling layer→second convolutional layer→second pooling layer→third convolutional layer→third pooling layer→fourth convolutional layer→fourth pooling layer→fifth convolutional layer→fifth pooling layer→sixth convolutional layer→sixth pooling layer→seventh convolutional layer→seventh pooling layer→eighth convolutional layer→eighth pooling layer→ninth convolutional layer→ninth pooling layer→tenth convolutional layer→tenth pooling layer→eleventh convolutional layer→eleventh pooling layer→twelfth convolutional layer→twelfth pooling layer→thirteenth convolutional layer→thirteenth pooling layer→fully-connected layer.

3. The bidirectional attention-based image-text cross-modal retrieval method according to claim 2, wherein in step (2a) the parameters of each layer are set as follows: each of the first convolutional layer and the second convolutional layer has 64 3×3 convolution kernels; each of the third convolutional layer and the fourth convolutional layer has 128 3×3 convolution kernels; each of the fifth convolutional layer, the sixth convolutional layer, and the seventh convolutional layer has 256 3×3 convolution kernels; each of the eighth convolutional layer, the ninth convolutional layer, the tenth convolutional layer, the eleventh convolutional layer, the twelfth convolutional layer, and the thirteenth convolutional layer has 512 3×3 convolution kernels; all pooling layers are max-pooling, and each of the pooling layers has 2×2 pooling kernels with a stride of 2; the fully-connected layer has 4086 inputs and 100 outputs.

4. The bidirectional attention-based image-text cross-modal retrieval method according to claim 1, wherein in step (9a) the softmax function is:

$$p_{q,j} = \frac{\exp(V_q^T T_j)}{\sum \exp(V_q^T T_r)},$$

where $p_{q,j}$ denotes the matching probability of a qth image to a jth text in the image-text pairs; exp denotes the natural exponential function; $V_q$ denotes a qth image feature of the qth image in the image-text pairs; T denotes the transpose operation; $T_j$ denotes a jth text feature of the jth text in the image-text pairs; Σ denotes a summation function; $T_r$ denotes a rth text feature of the rth text in the image-text pairs with r having a range [1, 15000].

5. The bidirectional attention-based image-text cross-modal retrieval method according to claim 1, wherein in step (9b) the softmax function is:

$$p_{j,q} = \frac{\exp(T_j^T V_q)}{\sum \exp(T_j^T V_s)},$$

where $p_{j,q}$ denotes the matching probability of a jth text to a qth image in the image-text pairs; exp denotes the natural exponential function; $T_j$ denotes a jth text feature of the jth text in the image-text pairs; T denotes the transpose operation; $V_q$ denotes a qth image feature of the qth image in the image-text pairs; Σ denotes a summation function; $V_s$ denotes an sth image feature of the sth mage in the image-text pairs with s having a range [1, 15000].

6. The bidirectional attention-based image-text cross-modal retrieval method according to claim 1, wherein in step (10a) the cross entropy formula is:

$$L_{j,q} = y_{j,q} \ln p_{j,q},$$

where $L_{j,q}$ denotes the cross entropy of the matching probability of a jth text to a qth image relative to a true matching probability of the jth text to the qth image; $y_{j,q}$ denotes the true matching probability of the jth text to the qth image; ln denotes the natural logarithm; $p_{q,j}$ denotes the matching probability of the qth image to the jth text.

7. The bidirectional attention-based image-text cross-modal retrieval method according to claim 1, wherein in step (10b) the gradient descent formula is:

$$A_{j,q}^{(s+1)} = A_{j,q}^{(s)} - \eta \times \frac{\partial L_{j,q}}{\partial A_{j,q}^{(s)}} \times A_{j,q}^{(s)},$$

where $A_{j,q}^{(s+1)}$ denotes an element of the attention matrix at jth row and qth column after (s+1)th iteration; $A_{j,q}^{(s)}$ denotes an element of the attention matrix at jth row and qth column after sth iteration; η denotes a learning rate;

$$\frac{\partial}{\partial}$$

denotes partial derivative; $L_{j,q}$ denotes the cross entropy of the matching probability of a jth text to a qth image relative to a true matching probability of the jth text to the qth image.

* * * * *